United States Patent [19]
Haynes

[11] 3,858,841
[45] Jan. 7, 1975

[54] VALVE

[76] Inventor: Larry E. Haynes, 23730 Via Kannela, Valencia, Calif. 91355

[22] Filed: Mar. 8, 1973

[21] Appl. No.: 339,225

[52] U.S. Cl......................... 251/43, 251/30, 251/42
[51] Int. Cl....................... F16k 31/383, F16k 31/40
[58] Field of Search................. 251/30, 42, 43, 129

[56] References Cited
UNITED STATES PATENTS

| | | | |
|---|---|---|---|
| 3,312,445 | 4/1967 | Trombatore et al. | 251/30 |
| 3,351,316 | 11/1967 | Lewis et al. | 251/30 |
| 3,410,518 | 11/1968 | Carsten | 251/285 X |
| 3,588,039 | 6/1971 | Chelminski | 251/129 X |
| 3,633,869 | 1/1972 | Lehmann | 251/129 |
| 3,698,682 | 10/1972 | Berning | 251/30 |

*Primary Examiner*—Arnold Rosenthal
*Attorney, Agent, or Firm*—Herzig & Walsh

[57] ABSTRACT

Solenoid operated pilot controlled, pressure operated piston valve. The valve is in the form of a cartridge adjustable in the body to adjust the valve stroke. The valve member is of a piston type guided internally and externally with respect to the cartridge which is cylindrical. The cartridge carries the pilot valve and solenoid controlling the actuation pressure for the piston valve.

4 Claims, 7 Drawing Figures

PATENTED JAN 7 1975

3,858,841

VALVE

SUMMARY OF THE INVENTION

The invention is a valve more particularly adapted for use in sprinkler systems but not limited thereto.

In a preferred exemplary form of the invention described in detail herein, it has a body having a valve cartridge which is adjustably positionable in the body relative to the valve seat so that the stroke of the valve can thereby be readily varied. The valve member is of a piston type, having a part guided in a bore in the cartridge which is cylindrical and having a piston sleeve part that is guided by the exterior of the cartridge. A pressure chamber is formed in the bore in the cartridge which control the valve, the pressure therein being controlled by a solenoid operated pilot valve.

The valve of the invention has a number of objects. The primary object is to provide a valve for this particular application and others which is of simplified construction using a fewer number of dependable parts and being simple and economical to fabricate, produce and maintain.

A further object of the invention is to provide a novel construction wherein the valve mechanism is in the form of a cartridge which is sealed to and adjustable in the body whereby the valve stroke and capacity of the valve are readily adjustable by adjusting the position of the cartridge.

Another object is to provide an improved valve construction wherein the valve is of a piston type having a part guided in a bore in the valve cartridge and a piston sleeve part guided by and sealed to the exterior of the cartridge.

BRIEF DESCRIPTION OF THE DRAWINGS

Further objects and additional advantages of the invention will become apparent from the following detailed description and annexed drawings wherein.

Figure 1:
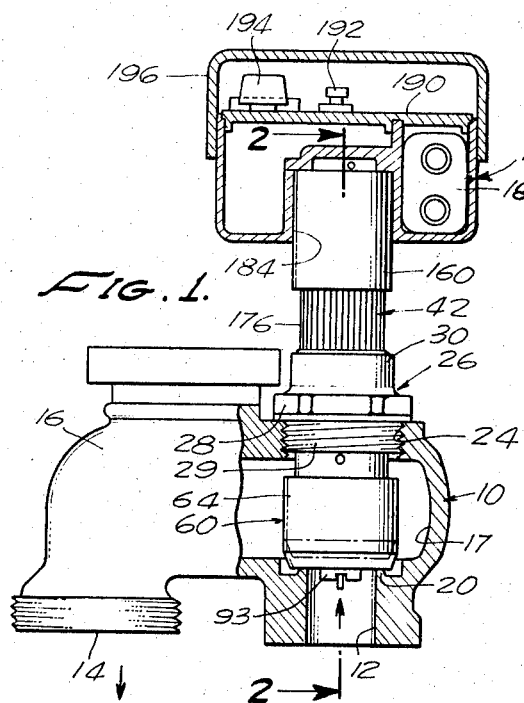
FIG. 1 is a partial broken away view of the exemplary form of the valve.
Figure 2:
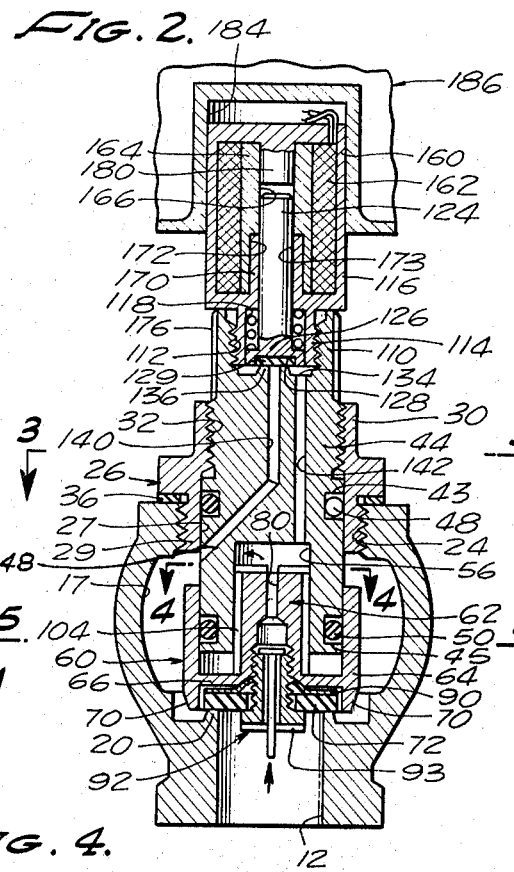
FIG. 2 is a sectional view taken along the line 2—2 of FIG. 1.
Figure 3:
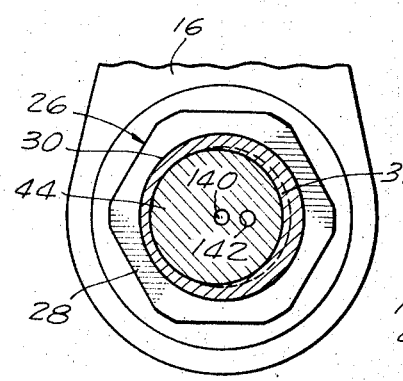
FIG. 3 is a sectional view taken along the line 3—3 of FIG. 2.

Referring now more particularly to the various figures of the drawing, numeral 10 designates a valve body having an inlet port 12 and outlet nozzle part 14 and a flat top cap or a bonnet 16. The cavity within the valve body is designated at 17. At the end of port 12 is a valve seat 20. Opposite the inlet port 12 is a threaded bore 24 in the body which receives an adaptor bushing as designated at 26 having a bore 27. The adapter bushing has a part 29 that threads into the bore 24. It has a flange part 28 and an upper threaded part 30 internally threaded as shown at 32. The flange 28 seals to the flat top 16 of the body by way of sealing washer 36 between these surfaces.

The valve itself is part of a cartridge designated generally by the numeral 42. The cartridge is cylindrical and it has an intermediate threaded part 44 that threads adjustably into the threaded bore 32. The lower part of the cartridge will be described first.

It is cylindrical having annular grooves 43 and 45 that receive sealing O-rings 48 and 50. O-ring 48 seals to the bore 27 in adapter 26 and O-ring 50 seals to the valve member itself, as will be described.

Figure 4:
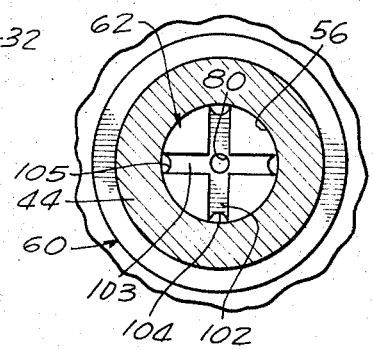
FIG. 4 is a sectional view taken along the line 4—4 of FIG. 2.
Figure 6:
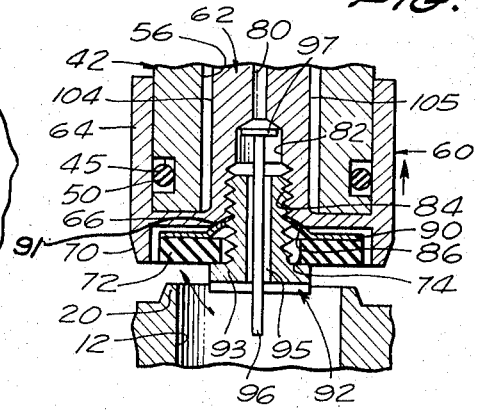
FIG. 6 is a partial enlarged sectional view corresponding to a part of FIG. 2.

The lower part of the cartridge body has a bore 56 as may be seen in FIG. 4. The valve member of assembly itself is designated generally by the numeral 60. See FIGS. 6 and 7. The valve member comprises a piston body having a central cylindrical part 62 and an integral outside sleeve or piston part 64, these parts being joined by way of web part 66. The outside part 64 has a lower extending flange 70 and received within it is a rubber or composition seat disc 72 having a central bore 74. The central part 62 of the valve member has a small bore 80; it has a larger counterbore 82, the upper end of which is tapered. It has a further threaded bore 84, the outer end of which has an annular spherical contour as shown at 86; positioned between the seat disc 72 and the web 66 is a washer 90 having a bore or center hole. Washer 90 has an edge flange 91 that has an annular spherical contour adjacent the annular spherical contour 86 of bore 84 there being .030 inch clearance between these parts to allow the sealing surface to align itself with the seat 20 in the event of any irregularity in the seat. The seating disc and the washer 90 are held in position by screw 92 which threads into the bore 84, the screw having a head 93 with a slot adapted to receive a screwdriver. The screw has a central bore 95 adapted to loosely receive pin 96 with head 97 which normally fits up against the tapered end of counterbore 82. Head 97 is of a size to prevent passage of any particle big enough to be unable to pass through bore 80, there being a taper as described between bores 80 and 82.

Figure 7:
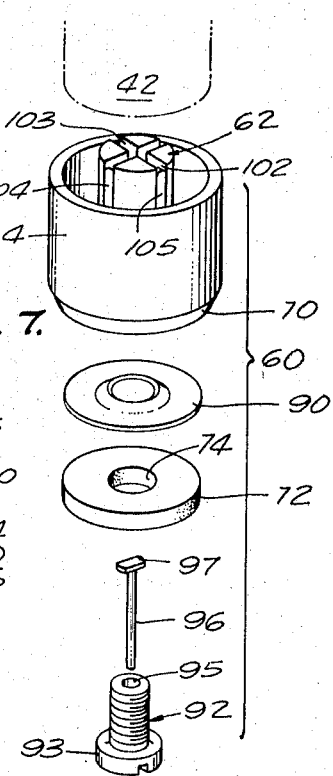
FIG. 7 is an exploded view illustrating the assembly of the valve unit itself.
Figure 5:
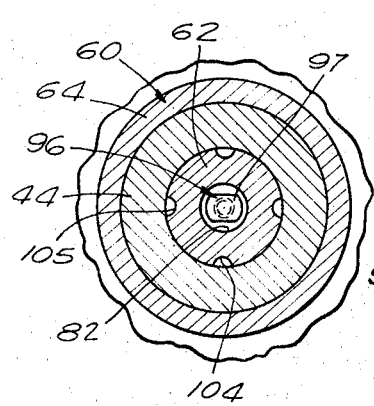
FIG. 5 is a sectional view taken along the line 5—5 of FIG. 2.

The part 62 is slotted axially and transversely, as may be observed in FIGS. 4 and 7 by way of transverse slots as designated at 102 and 103 and axial slots 104 and 105, so as to readily provide for flow of pressure between the sidewalls of this part and bore 56.

The upper end of the cartridge 42 is designated at 110. It has threaded bore 112 into which is threaded a nipple 114 extending downwardly from the shell 116 of the solenoid assembly that will be described presently. The nipple 114 has a bore 118.

The pilot valve has a plunger stem 124 on the end of which is the pilot valve 126 which is enlarged and which has an end depression 128 that receives sealing seat 129; at the bottom of the threaded bore 112 is an annular (ring-shaped) depression 134 and around the inner edge of this is formed the pilot valve seat designated at 136 which is at the end of a bore 140 in the cartridge 42. Numeral 142 designates a second axial bore in the cartridge 42 which connected between the bore 56 in the cartridge and annular depression 134 at the bottom of threaded bore 112. The bore 140 has an angular part 148 which communicates through a side of the cylindrical body of the cartridge 42.

In the exemplary embodiment of the valve as shown, the pilot valve which is valve 126 is solenoid operated by a solenoid which is preferably of a latching type that latches by way of a permanent magnet.

The solenoid assembly comprises a cylindrical permanent magnetic shell 160 from which the nipple 114 extends. Within this shell is the solenoid winding 162, on bobbin or sleeve 164 having a bore 166 in which the stem 124 of the pilot valve moves, the stem being the solenoid armature. Extending upwardly from the bottom of the shell 116 is a sleeve or nipple 170 that fits into the relieved part or parts of smaller diameter 172 at the lower part of sleeve 164, stem 124 sliding in the bore of the nipple 170, this bore being designated at 173 and bore 166.

The part of the cartridge 42 just below the solenoid assembly is of smaller diameter and is knurled as designated at 176, so that the entire cartridge can be adjusted, that is, rotated thereby to adjust its axial position with respect to the valve body. Thus, the stroke of the valve is adjustable, as will be described more in detail presently. The shell 160 has a part 180 that extends down into the bore 166 in sleeve 164, parts 180 and 173 being of opposite polarity.

The shell of the solenoid assembly extends into a receptacle 184 in housing 186 which also contains a battery 188 for battery operation of the solenoid. The housing is preferably rectangular, having a top cap or cover 190 mounted by screws 192. Numeral 194 designates an adjusting knob operable to adjust a thermostat or automatic timer which may be utilized for control of the valve, the thermostat or timer not being shown. A removable cover 196 is provided which can be manually removed from the housing 186.

From the foregoing, it will be observed that the adapter bushing 26 is sealed to the valve body 10. The cartridge 42 is adjustable by rotating it to adjust its sealed axial position in the adapter bushing 26 and to thus be capable of adjusting the relative position as between the valve assembly and the seat 20, thereby to readily adjust the stroke and capacity of the valve.

The operation will be readily understood from the following. The inlet pressure will of course pass through the bore 95 in screw 92 and through the counterbores 80 and 82 in the valve unit 60 into the chamber formed within the bore 56 in the cartridge 42. The pressure can pass down through the axial grooves in the part 62 to the chamber at the end of the cartridge and above the transverse part 66 of the valve member 60. This pressure will normally hold the valve firmly seated against the seat 20 and the valve of course being guided in its movements relative to the cartridge by the inner cylindrical part 44 and the other sleeve part 64.

To open the valve the solenoid actuator is actuated to lift the plunger stem 124 and open the pilot valve and it can be latched in the open position, that is, held open by the permanent magnet, no current being required, and closed by application of reverse polarity. This type of solenoid is known in the art. The opening of the pilot valve placed bores 142, 140 and 148 in communication, releasing the pressure within the chamber formed within bore 56 and within the inside of valve member 60, the pressure being released into the cavity 60 of the valve body. The valve inlet pressure is thus able to move the valve unit or assembly upwardly with respect to the end of the cartridge 44 to open the valve. The valve will remain open until the solenoid is actuated to close the pilot valve and when it is closed, of course, the main valve again closes in response to accumulation of pressure that moves the valve unit assembly 60 down against the seat.

From the foregoing, those skilled in the art will readily understand the nature of the construction of the valve and the manner in which it achieves and realizes the objects as set forth in the foregoing. The construction is simplified in that a minimum number of parts is required which are very positive in action and dependable. The capability of the valve is considerably increased by reason of the easy adjustment of the cartridge which positions the valve unit relative to the seat controlling the amount of stroke of the valve itself. The valve itself is guided by its internal cylindrical part and also by the external piston sleeve part which is sealed. When the cartridge is adjusted, the valve continues to be similarly sealed, the cartridge body, of course, remaining sealed to the adapter bushing in the valve body.

The foregoing disclosure is representative of a preferred form of the invention and is to be interpreted in an illustrative rather than a limited sense, the invention to be accorded the full scope of the claims appended hereto.

What is claimed is:

1. A valve construction comprising a valve body having a valve seat therein, a valve cartridge adjustably and sealingly mounted in the body and adjustable toward and away from said seat, said valve cartridge carrying a valve member movable with respect to the valve seat for opening and closing the valve and means for actuating the valve member, said valve cartridge comprising a stem having the valve member carried thereby with a pressure chamber formed between the said stem and the valve member and means for controlling the pressure within said chamber for actuating the valve member, said last means including pilot valve means, said valve member being in the form of a piston having sliding relationship with said cartridge stem so as to be guided thereby, said valve member including a guide part fitting within a bore within the cartridge stem and a sleeve part into which the cartridge stem fits.

2. A valve as in claim 1 wherein the said valve member has passageway means therethrough into said chamber.

3. In the valve construction in combination, a valve body having an inlet port and a valve seat, a cylindrical stem member in said body, a valve member including a part slidably and sealingly carried by said stem member and movable to open and close said valve seat, said member and said valve member, having mutually engageable guide means including the stem having a bore and said valve member having a part slidably engaged in the bore, said valve member having a sleeve part slidably engaging the stem.

4. A valve structure as in claim 3, including a washer member carried by said valve member, said seat and the washer member having mutually interfitting configurations whereby to effect centering of the valve member.

* * * * *